United States Patent
Beggs et al.

(10) Patent No.: US 7,458,156 B2
(45) Date of Patent: Dec. 2, 2008

(54) SPOOL VALVE ASSEMBLY APPARATUS USING AIR VORTEX INSERTION

(75) Inventors: Orrin Pierce Beggs, Belvidere, IL (US); Lane Matthew Johnson, Rockford, IL (US); Jeffery Wayne Berg, Rockford, IL (US)

(73) Assignee: Lamb Assembly and Test, LLC, New York, NY (US)

( * ) Notice: Subject to any disclaimer, the term of this patent is extended or adjusted under 35 U.S.C. 154(b) by 601 days.

(21) Appl. No.: 11/175,673

(22) Filed: Jul. 6, 2005

(65) Prior Publication Data
US 2007/0006457 A1   Jan. 11, 2007

(51) Int. Cl.
*B21K 1/20* (2006.01)
(52) U.S. Cl. .................................. 29/890.124
(58) Field of Classification Search ............... 29/405, 29/429, 525, 890; 239/405
See application file for complete search history.

(56) References Cited

U.S. PATENT DOCUMENTS

| | | | |
|---|---|---|---|
| 3,885,295 A * | 5/1975 | Engelberger et al. | 29/429 |
| 4,833,765 A * | 5/1989 | Bohland | 29/890.124 |
| 5,011,339 A | 4/1991 | Aurtoi et al. | |
| 5,203,509 A * | 4/1993 | Bieg | 239/405 |
| 5,289,634 A * | 3/1994 | Makino et al. | 29/890.124 |
| 5,456,007 A | 10/1995 | Bove et al. | |
| 5,694,964 A * | 12/1997 | Bloomfield et al. | 137/15.21 |
| 5,829,134 A | 11/1998 | Johnson et al. | |
| 2007/0157452 A1 * | 7/2007 | Higgins | 29/525 |

FOREIGN PATENT DOCUMENTS

| | | |
|---|---|---|
| JP | 63-295129 | 12/1988 |
| SU | 1260310 | 9/1986 |

\* cited by examiner

*Primary Examiner*—David P Bryant
*Assistant Examiner*—Ryan J Walters
(74) *Attorney, Agent, or Firm*—Reising, Ethington, Barnes, Kisselle, P.C.

(57) ABSTRACT

The effects of an air bearing may be augmented in various ways in order to assist in the automated assembly of valve spools into valve bores. Such augmentation may be achieved by agitating one end of the valve spool with sequentially applied pulses of pressurized air as the spool is being lowered into the valve body, increasing the effective length of the valve spool so that the agitation can be applied to the spool when the spool is partially inserted into the body, varying the position of the valve spool while the spool is being inserted into the valve body to expose a length of the spool to the pulses of pressurized air, and applying an oscillating vibration to the fixture that supports the valve body to dislodge a spool that has become jammed in the valve bore.

11 Claims, 4 Drawing Sheets

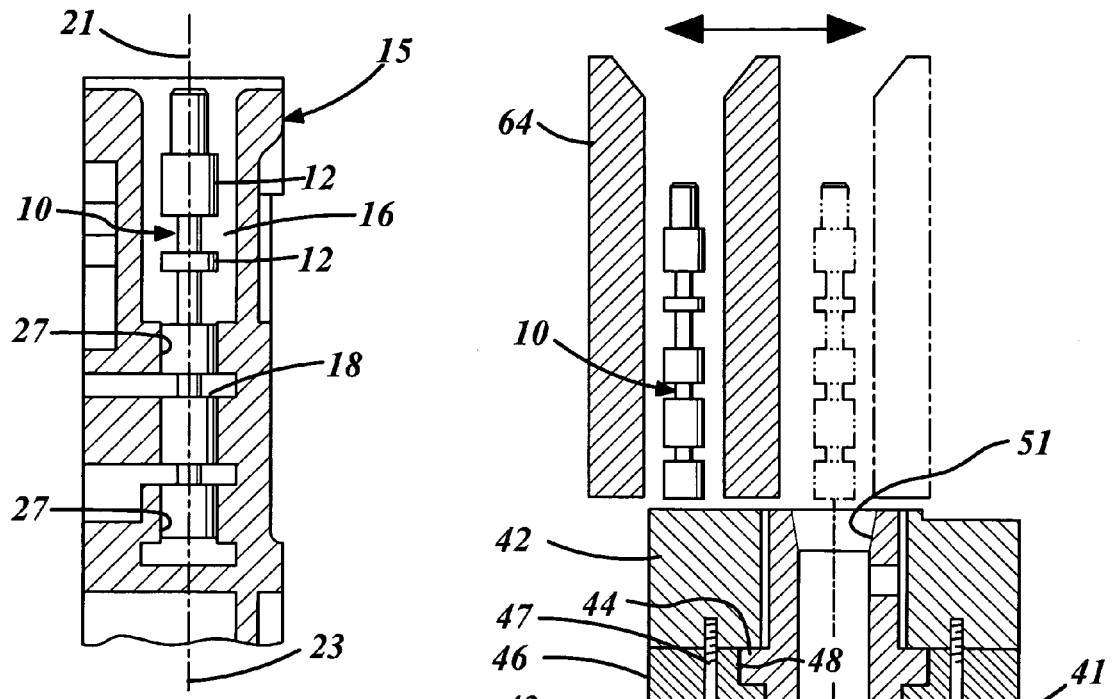
FIG. 4
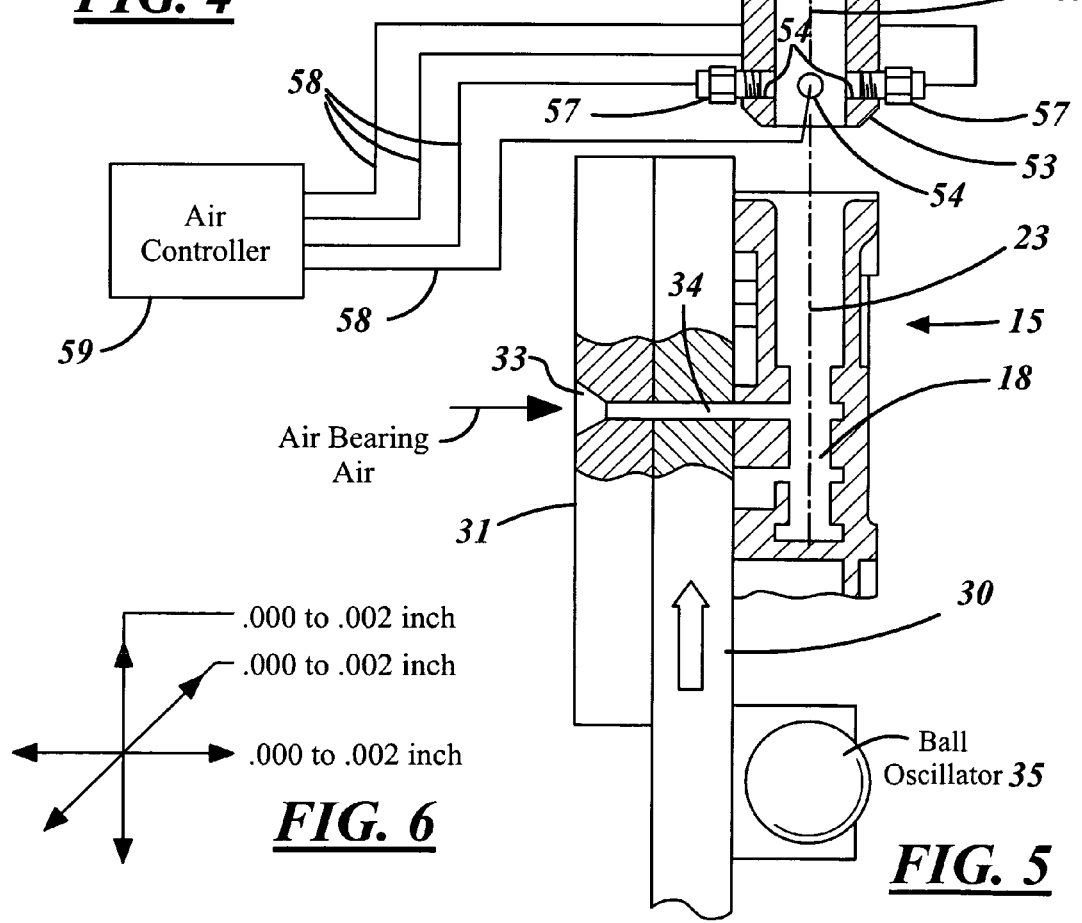
FIG. 6
FIG. 5

SPOOL VALVE ASSEMBLY APPARATUS USING AIR VORTEX INSERTION

FIELD OF THE INVENTION

The invention relates to a method and apparatus for assembling a valve spool into a valve body.

BACKGROUND OF THE INVENTION

Currently, assembling elongated spools into close fitting valve bodies is a manual operation. The reason for this is that clearance between spool lands and bores is .0005 inch, the lands and bores have sharp corners (no lead chamfers), and the bores may not be manufactured to a datum plane. If a bore is machined to a datum plane, then it is a simple matter to orient the bore in a fixture for a later assembly process with the bore oriented in a desired direction, since the orientation of the bore relative to the valve housing is precisely known. If a spool bore is not machined to a datum plane, it is difficult in a later assembly process to precisely align the machined bore with the insertion tooling for a valve spool so that the spool can be inserted into the bore. Even if a bore is machined to a datum plane, a method is still needed to assist the leading end of the spool to find and enter the land bores in the housing. Currently, there is no reliable method or configuration of tooling that will align spools to bores through which a spool can be dropped into a bore with clearance of .0005 inches.

One technique for facilitating the assembly of a spool into a valve bore uses an air bearing as shown in U.S. Pat. No. 5,829,134 for a Spool Valve Loading Method and Apparatus. The method and apparatus described therein uses pressurized gas at a first pressure to advance a valve spool into a valve body bore, and at the same time pressurized gas at a second lower pressure is applied to the valve body bore to create a moving cushion of air that opposes the insertion of the valve spool into the valve bore. The cushion of air from the valve body creates an air bearing that centers the spool in the bore so that the spool can be inserted the full length into the bore without hanging up on the lands of the bore.

The technique described above provides satisfactory results provided the spool bores are machined to a datum plane. If the spool bores are not machined to a datum plane, since the bores cannot be precisely aligned with the insertion tooling for the valve spools, the spools will jam if the valve body is positioned too close to the insertion tooling. As the gap between the valve body and the insertion tooling is increased, the tooling cannot maintain the alignment of the spool to the bores, with the result that the spools will jam as they are inserted into the bores, or the leading end of the spool will contact and rest on the surface around the entrance to the bore.

For the foregoing reasons, the air bearing technique, by itself, does not work for all combinations of spool lengths and spool land diameters. Additional assembly aids are needed to produce an assembly system that will successfully load spools over 95% of the time. The features described herein provide the compliance needed for the spool to be inserted into the bore in a valve body in an automated assembly operation.

BRIEF DESCRIPTION OF THE SEVERAL VIEWS OF THE DRAWING

FIG. 4 shows a valve spool that has been fully inserted into the small bore of a valve body.

FIG. 5 shows a valve body mounted on a fixture in a raised position and located below a valve spool insertion tool.

FIG. 6 shows the motion applied to a fixture by a ball oscillator.

BRIEF SUMMARY OF THE INVENTION

Figure 3:
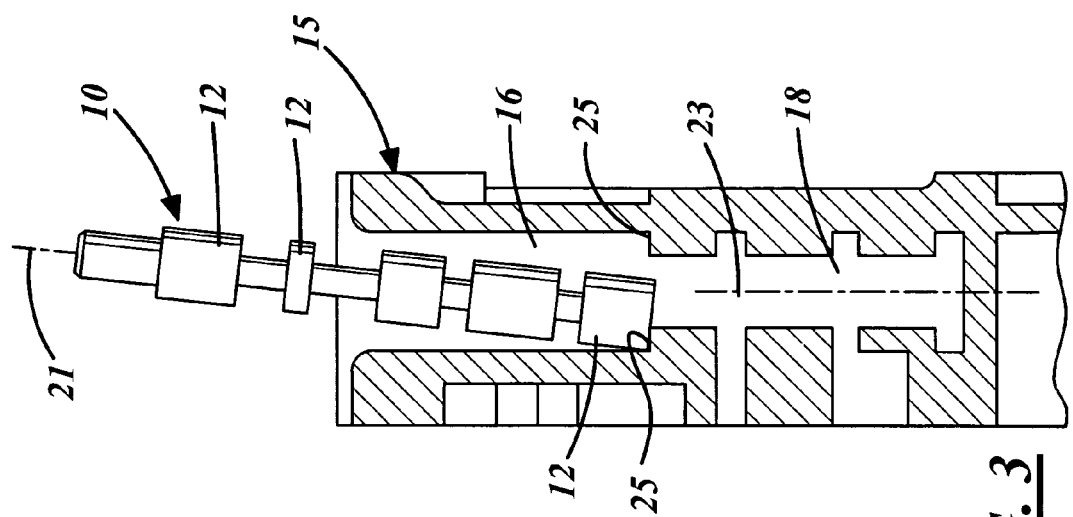
FIG. 3 shows a valve spool in an off axis position as it begins to enter the small bore of a valve body.

It has been determined that the effects of an air bearing may be augmented in various ways in order to assist in the automated assembly of valve spools into valve bores. Such augmentation may be achieved by agitating the valve spool as it is being lowered into the valve body, increasing the effective length of the valve spool so that the agitation can be applied to the spool when the spool is partially inserted into the body, agitating the fixture that supports the valve body, and altering the position of the valve spool relative to the agitation source so that the agitation will have a greater effect on the spool.

A spool is dropped into insertion tooling positioned directly above the valve body. The insertion tooling allows the spool to fall through a nozzle aligned with the bore in the valve body. Near the outlet of the nozzle, small holes are drilled around the circumference of the nozzle. As the spool falls through the nozzle, air is sequentially introduced into the holes. The pulsating air creates an air vortex and causes the top of the spool to move in an irregular pattern. The resulting motion of the spool permits the spool to "oscillate" and eventually find the hole in the small bore of the valve body. The continued application of the air vortex as the spool descends into the valve body tends to push on the spool from the top, oscillating the spool until it clears the nozzle and is fully inserted into the bore.

To increase the effective length of short spools and expose more area of the spool to the air vortex, a spring or removable extension is mounted on the shaft on the top end of the spool. The combined length of the valve spool plus the extension helps to maintain the perpendicularity of the spool during the drop into the valve bore and provides additional surface area to receive the pulsating air.

A pneumatic ball oscillator attached to the fixture provides a smooth oscillation motion to the fixture at a sufficient frequency to cause the lower end of the spool that is confined in the bore to move off of any point of rest between the spool and the bore. The ball oscillator provides a smooth, cycloidal type of movement to the fixture. The cycloidal movement of the ball oscillator induces sufficient movement to the valve body and prevents the spool from maintaining one angular position in, or resting within the confinement of, the bore. The oscillator can be set to vibrate differently for each different spool configuration.

A variable position fixture may also be used to hold the valve body. Depending on spool length and the number of and diameter of spool lands, one position of the fixture may not be sufficient for the air bearing or vortex to move and oscillate the spool. A servo controlled vertical slide allows the position of the valve body to be set for various spool lengths and configurations. After the spool falls into the large bore of the valve body, the bottom end of the spool may come to rest on a surface. Unless the spool end is moved off this surface, it will not drop into the valve bore. If the pulsating air in the nozzle of the insertion tooling is not directly opposite a spool land, the effects of the air vortex on the spool may be minimal. Varying the distance between the valve body and the insertion tooling allows the pulsating air to be directed against the spool at many positions along the spool. As a result, the spool tends go through a series of stop and start movements as it passes the pulsating air in the nozzle.

DETAILED DESCRIPTION OF THE INVENTION

Figure 1:
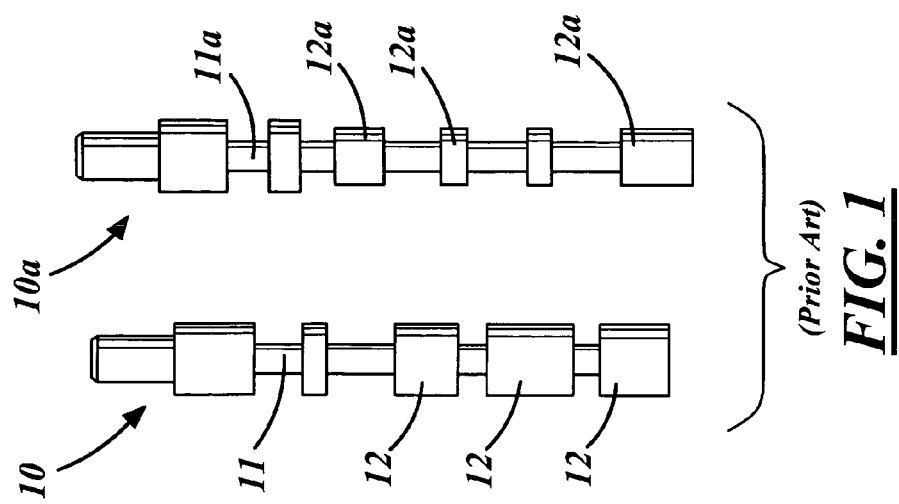
FIG. 1 shows various configurations of a valve spool.

Turning now to the drawing figures, FIG. 1 shows two forms of valve spools 10 and 10a. Each of the valve spools comprises an elongated shaft 11 and 11a on which are positioned a plurality of valve lands 12 and 12a. The valve lands each have a diameter that is larger than the diameter of the elongated shaft on which they are mounted. The valve lands 12 and 12a have various axial lengths depending on the configuration of the valve bodies into which they will be mounted. Such valve spools are well known in the art.

Figure 2:
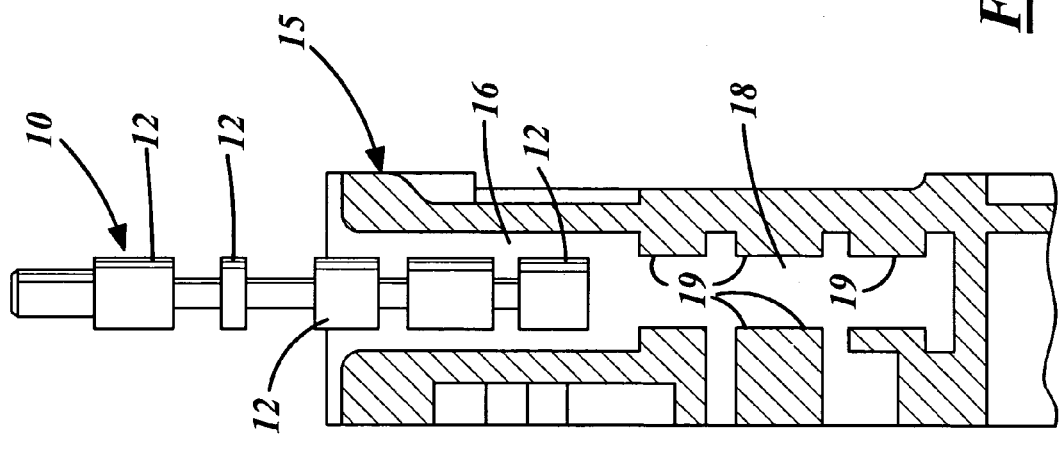
FIG. 2 shows a valve spool that has been inserted into the large bore of a valve body but not into the land bores.

FIG. 2 shows a valve spool partially inserted into a valve body 15. The valve body 15 is formed with a large upper bore 16 and a lower smaller bore 18 having a smaller diameter than the diameter of the upper bore 16. The lower bore 18 forms the valve portion of the valve body, and the lower bore includes a number of lands 19. The lands on the valve body fit closely around the lands 12 formed on the valve spool. The clearance between the spool lands and the valve lands is typically 0.0005 inches. Such valve spools are typically used in transmission assemblies, but may be used in any device in which spool valves are employed.

FIG. 3 shows a valve spool that is in a jam position as a result of being angularly misaligned with the axis of the valve bore 18. The axis 21 of the valve spool 10 is not exactly aligned with the axis of the bore 23 of the valve body 15. As a result of the misalignment, the lowermost land 12 on the spool is jammed against the upper land 25 formed in the valve body that surrounds the entrance to the small bore 18.

FIG. 4 shows a valve spool 10 that is fully inserted into a spool valve body 15. Although some of the lands 12 on the valve spool are shown as being aligned with lands 27 on the valve body, the alignment of the lands of the valve spool and body is not necessary for the valve spool to be fully inserted in to the valve body 15. What is necessary is that the axis 21 of the valve spool becomes perfectly aligned, for a short period of time with the axis 23 of the bore in the spool valve body. Once the spool enters the bore, the oscillation and gravity cause it to fall to the bottom of the bore as more fully explained below.

FIG. 5 shows a preferred embodiment of the assembly apparatus in which a fixture 30 is attached to a vertically driven servo slide 31 that is in the up position. The valve body 15 is releasably mounted on the fixture 30. The servo slide 31 is mounted for controlled motion in a direction that is approximately parallel to the bore axis 23 of the valve body 15. The motion of the servo slide 31 is only approximately parallel to the bore axis 23 since the bore 18 in the valve body may not have been machined to a datum plane, and as a result, it is impossible to mount the valve body and the fixture on the servo slide so that the bore axis 23 is exactly vertical. In the embodiment that is shown, the servo slide is mounted for vertical motion. The motion of the servo slide 31 is controlled by a servo controller (not shown) and the servo slide is mounted on a slide mechanism such as rails (not shown) as well known in the art. The servo slide 31 may be driven by a mechanism that is electromagnetic, mechanical, pneumatic, or hydraulic in nature, as well known in the art. The servo slide includes an inlet 33 that is coupled to a passageway 34 in the fixture for air that is blown into the valve bore 18 in order to form an air bearing as described in U.S. Pat. No. 5,829,134 described above. With the servo slide in this position, the air bearing air admitted into the valve bore 18 is on. The servo slide 31 allows the valve body 15 to be positioned relative to the insertion tooling 41 described below so that the air bearing has the desired effect.

A ball oscillator 35 is mounted on the lower portion of the fixture 30. The ball oscillator provides a smooth cycloidal oscillation motion to the fixture 30 at a sufficient frequency to cause the lower end of the spool 10 that is confined in the bore to move off of any point of rest. Depending on the angular mounting position of the oscillator, the fixture movement can be from 0.000 to 0.002 inch in any direction. Normally, it is from 0.000 to 0.002 inch in any of the three major axis, X, Y and Z. The cycloidal movement of the ball oscillator 35 induces sufficient oscillation in the valve body 15 to prevent the spool 10 from maintaining one angular position and or resting within the confinement of the bores 16 and 18. The oscillator can be controlled to produce a different oscillation, frequency or amplitude, for each different spool configuration. In the preferred embodiment, the ball oscillator 35 is pneumatic ball rotary device, but other types of oscillators may be used.

FIG. 6 shows the motion imparted to the fixture 30 and the valve body 15 by the ball oscillator 35. Accordingly, the fixture and the valve body may be moved 0.000 inch to 0.002 inch in any direction.

Returning to FIG. 5, directly above the valve body 15 is a spool insertion tool 41 mounted on a tooling support 42. The insertion tool 41 is an elongated hollow body having an axial bore 43 slightly larger that the diameter of the spool lands that will be inserted by the insertion tool. The axial bore 43 has a center axis 45. The insertion tool 41 is formed with a mounting ring 44 on its outer surface. A mounting plate 46 is attached to the underside of the tooling support 42 by suitable fasteners 47. The mounting plate 46 is formed with a recess 48 to receive the mounting ring 44 and to secure the insertion tool to the tooling support. The insertion tooling 41 may be attached to the tooling support 42 in ways other than as shown as will be appreciated by those skilled in the art.

A flared opening 51 is formed on the upper portion of the axial bore 43 of the insertion tool 41 to allow the valve spool to be funneled into the insertion tool without becoming jammed on the top opening of the axial bore. The lower end of the axial bore is formed with a nozzle 53. A plurality of holes 54 is formed around the circumference of the nozzle 53. In the preferred embodiment, four holes 54 are equally spaced around the circumference of the nozzle, and are preferably about ⅛ inch in diameter, but other arrangements, numbers and sizes of holes may be used. The holes 54 are formed so that the axis of the holes intersects with the axis 45 of the insertion tooling. The holes may be formed at other angular orientations. Inlet fittings 57 are mounted in each of the holes 54, and air supply lines 58 are attached one each to the inlet fittings. The air supply lines 58 are coupled to an air controller 59. The air controller 59 controls the admission of air through the air supply lines 58 to the four holes formed in the nozzle 53 of the insertion tooling. In the preferred embodiment, the air controller 59 causes air to be sequentially introduced into the holes 54. The pulsating air creates an air vortex in the insertion tooling nozzle 53, and causes the top of the spool 10 to move in an irregular pattern as the spool falls through the nozzle 53. The air controller 59 delivers air to air supply lines at a pressures from 15 to 60 pounds per square inch. Although the nozzle is shown formed on the end of the insertion tooling 41, the nozzle could also be formed as a separate stand alone unit positioned between the insertion tooling and the valve body 15.

FIG. 5 additionally shows an escapement slide 64 mounted above the tooling support 42 and a valve spool 10 in the escapement slide. The escapement slide 64 is shown ready to move to the right to drop the spool 10 into the insertion tool 41. The escapement slide 64 comprises an elongated hollow holder that is dimensioned to receive a valve spool. The position of the escapement slide is controlled by a suitable mechanism that moves the slide back and forth from the position shown where it is adjacent to the opening of the insertion tool 41 to a position shown in phantom which is directly over the insertion tool 41. When it is directly over the insertion tool, the valve spool 10 will be in alignment with the axis 45 of the insertion tool and the axis 23 of the valve body.

Figure 7:
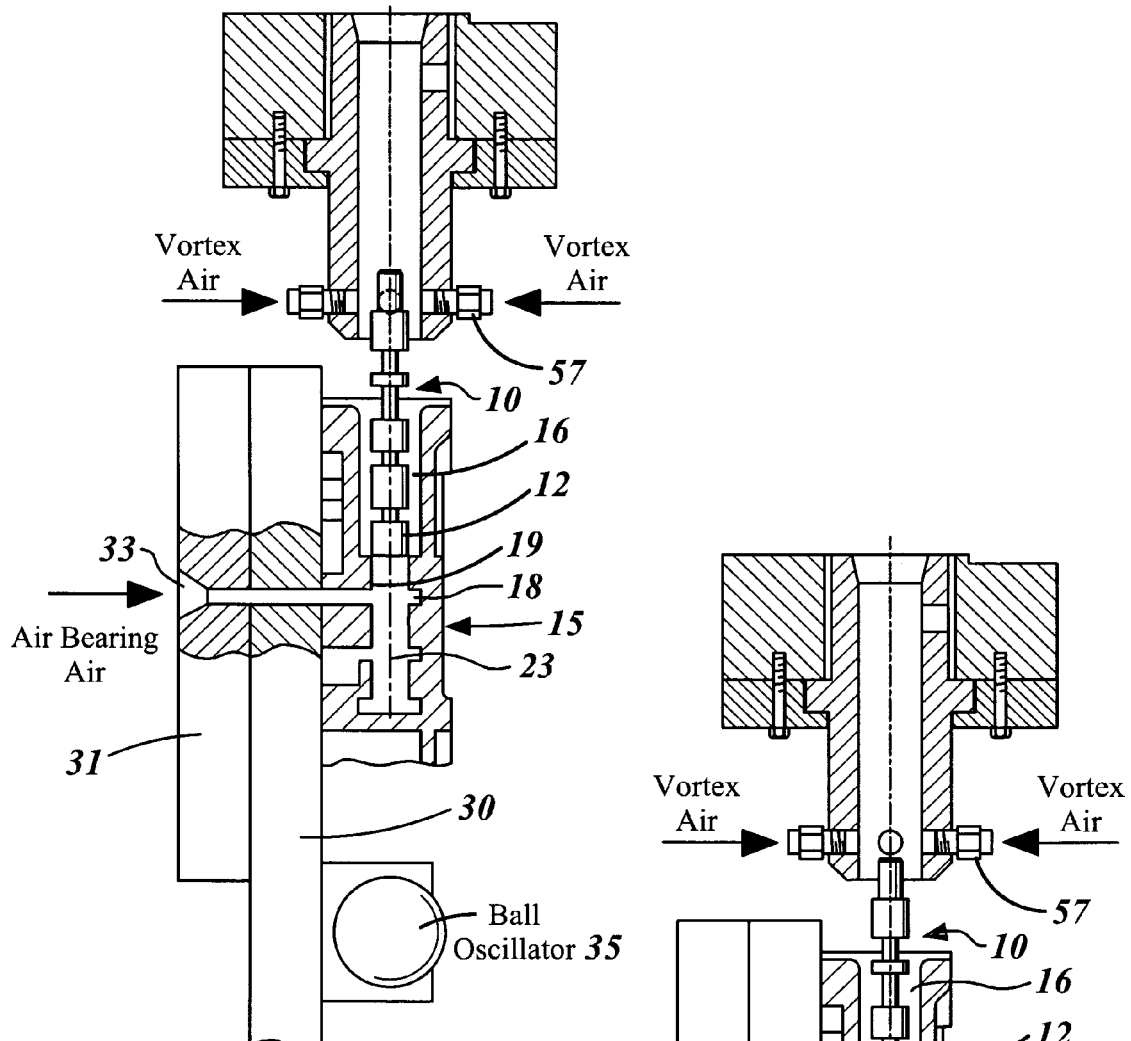
FIG. 7 shows a valve body mounted on a fixture in a raised position with a spool inserted into the large bore of a valve body.

FIG. 7 shows the valve spool 10 as it is being inserted into the top of the valve body 15. The servo slide 31 and the fixture 30 are shown in the up position. The air bearing air applied to the inlet 33 is on. The spool 10 has moved to the drop position, and the spool has entered the large bore 16 of the valve body 15. The vortex air applied to the inlets 57 is turned on during the drop of the spool, and the ball oscillator 35 is turned on. The valve spool 10 is in alignment with the axis 23 of the bore of the valve body. The air controller 59 applies air sequentially to the air inlets 57 so that an air vortex is created in the insertion tooling nozzle 53. This allows the spool 10 to oscillate laterally as it lowers into the valve body 15. The pulsating air causes movement of the spool in an irregular pattern and the lower end of the spool will "hunt" until the lowermost land 12 on the spool is exactly aligned with the upper land 19 of the valve body. When the exact alignment occurs, the spool will drop into the lower bore 18 of the valve body.

Figure 8:
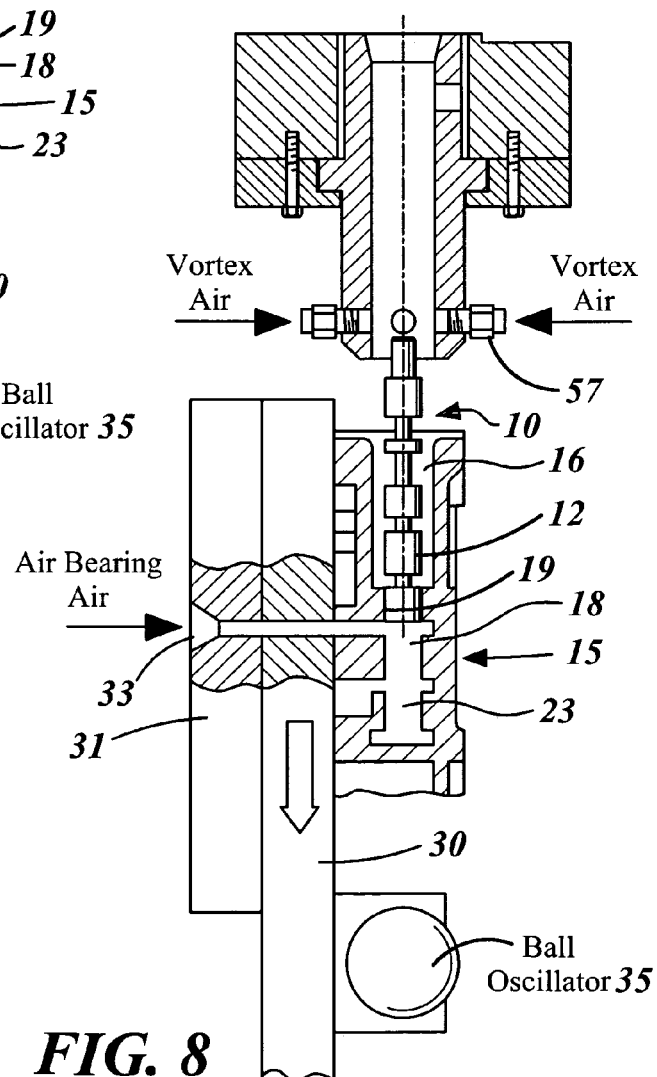
FIG. 8 shows a valve body mounted on a fixture moving from a raised position to a lowered position with a spool inserted into the top of the small bore of the valve body.

FIG. 8 shows the valve spool 10 as the lowermost land 12 on the spool enters the upper land 19 on the valve body. The air bearing air applied to the air inlet 33 is on. The air vortex air applied to the nozzle inlets 57 is on. The servo slide 31 with the fixture 30 is slowly moving down to allow for the maximum effect of the air vortex on the spool 10 as the lowering spool allows the vortex air to impact on both the shaft 11 and the lands 12 of the spool. The rate of descent of the servo slide 31 may be varied until the best results for each different valve and spool configuration are determined by trial and error. The typical rate of descent for the servo slide 31 is one-half inch per second. Depending on spool configuration, this speed may vary. Most spool configurations do not require fixture movement during insertion. One position of the fixture relative to the nozzle is sufficient for most spools to find and drop into their respective bores. The ball oscillator 35 is on to prevent the spool from resting in one place in the valve bore.

The application of the vortex air to the nozzle 53 of the insertion tool 41 will cause the spool to vibrate slightly as it falls by gravity into the valve body 15. At the same time, as the spool lowers further into the valve body, the vortex air introduced into the insertion nozzle tends to push on the top of the spool 10 in addition to oscillating the spool until the spool completely clears the insertion nozzle 53 and is lowered into final position in the valve body 15.

Figure 9:
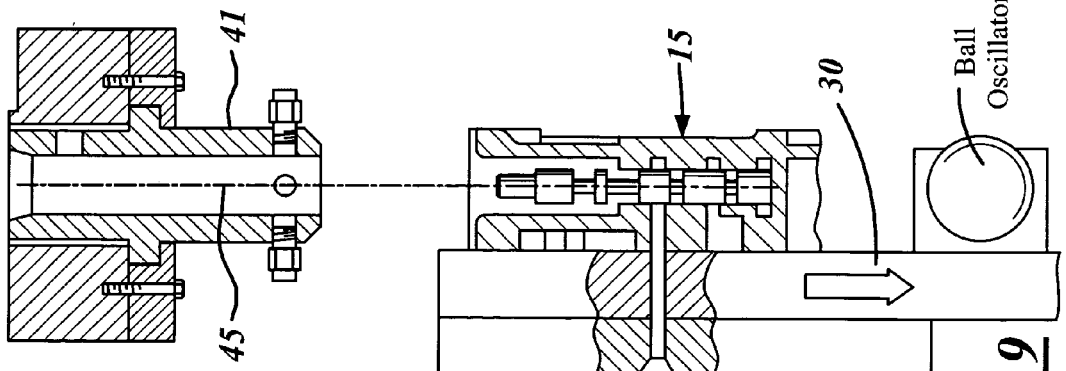
FIG. 9 shows a valve body mounted on a fixture in a lowered position with a spool inserted into the small bore of a valve body.

FIG. 9 shows the servo slide 31 and the fixture 30 in the down position. The air bearing air applied to the inlet 33, the vortex air applied to the air inlets 57, and the ball oscillator 35 are all off. The spool 10 is in the fully inserted position in the spool valve housing 15.

Automated inspection for the presence of a spool "out of position" may be performed by optical sensors, not shown, positioned at the top of the valve body 15. If a spool fails to fall below the top surface of the valve body 15, the sensor will detect this condition and stop the automated assembly process. Such automated inspection processes and the apparatus therefor are well known to those skilled in the art.

Figure 10:
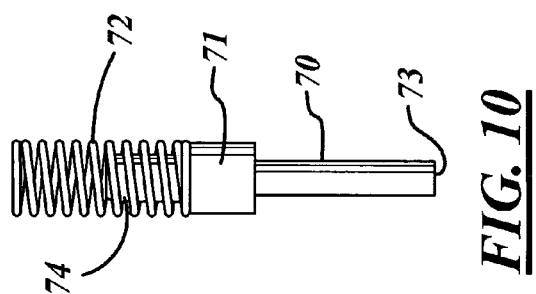
FIG. 10 shows a valve spool with an extension mounted on one end of the spool.

FIG. 10 shows a short length spool 70 with one large land 71 near the top. The shape and mass distribution of spool 70 makes it unstable as it falls into the bore of a valve body. The length of the land 71 is not sufficient to maintain perpendicularity between the spool and the bore 18 as the spool falls into the bore. The bottom end 73 of the spool tends to catch on the surface 25 at the entrance of the small bore 18 as shown in FIG. 3, and the spool lies to one side. In this cocked position, the top of a short spool is below the injection tooling nozzle 53, and as a result, the air vortex in the nozzle has no effect on the spool.

The effective length of a short spool 70 may be increased by mounting a removable extension such as a spring 72 on the upper end 74 of the spool. The inner diameter of the removable extension 72 is chosen so that it is a slip fit over the outer diameter of end 74 of the spool on which it will be mounted. Once the extension 72 has been mounted on the spool 70, the spool is loaded into the escapement slide 64 in the usual way. The escapement slide is moved into position over the insertion tooling so that the spool with the extension mounted thereon can drop into the insertion tooling 41.

Figure 11:
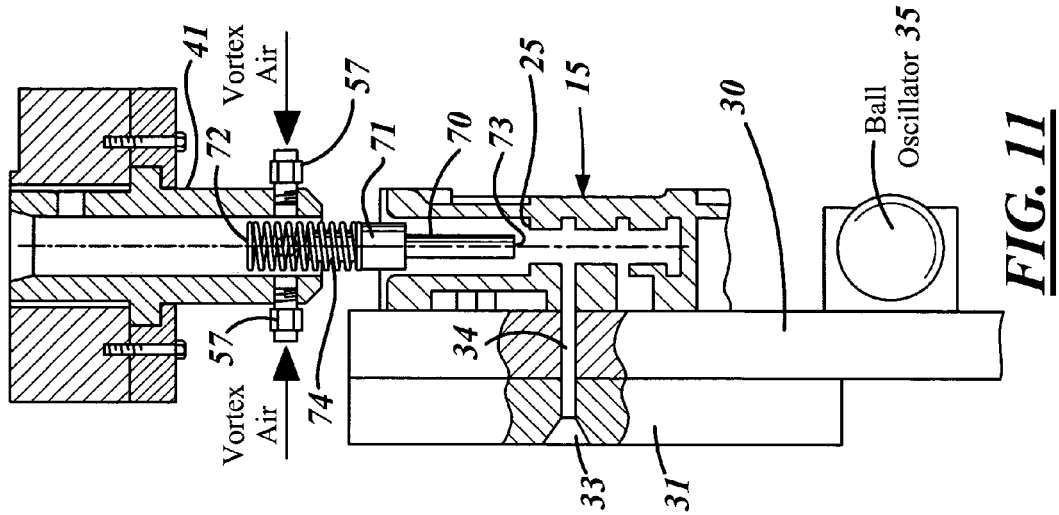
FIG. 11 shows a valve spool with an extension mounted on one end of the spool being inserted into a valve body.

FIG. 11 shows the spool 70 with a spring 72 mounted thereon as the spool enters the lower portion of the valve body. Although the top end 74 of the spool has passed through the nozzle 53, the upper portion of the spring 72 is still contained within the nozzle. The upper portion of spring 72 presents a surface against which the vortex air can act, and as a result, the vortex air can continue to produce oscillations in the spool 70 after the spool itself has dropped below the insertion tooling nozzle 53. After assembly of the spool into the valve body 15, the extension is removed.

Although the extension has been described as a removable spring, the spring does not have to be removable, and other forms of extension device may be used. For example, if the valve spool when assembled into the valve body includes a spring on the top end of the valve for operational purposes, the spool with the spring attached may be assembled into the valve body as a subassembly. In this situation, the spring is not removed after the spool has been inserted into the valve body. In another example, the extension may comprise a length of tubing that fits over the top end 74 of the spool. The tubing may be formed of metal, nylon or rubber, or other hollow material that may be slip fit over the top end of the spool.

Although the invention has been described in the environment valve spools used in automatic transmission assemblies, the spool assembly technique described herein can be used for assembling any elongated valve spool into a tight fitting bore. Such constructions may be used on hydraulic valves, pneumatic valves, or other similar configurations in a variety of valve applications.

Having thus described the invention, various modifications and alterations will occur to those skilled in the art, which modifications and alterations are intended to be within the scope of the invention as defined by the appended claims.

We claim:

1. A method for assembling an elongated valve spool into the bore of a spool valve body, the method comprising the steps of:

positioning the spool valve body so that the axis of the bore is in a vertical orientation;

positioning a nozzle above the valve body;

positioning the valve spool in a vertical orientation above the valve body;

passing the valve spool downward through the nozzle before the spool enters the valve body;

introducing the valve spool into the upper portion of the valve body;

agitating either the valve spool or the valve body as the valve spool is lowered into the valve body, the agitation moving the valve spool off of any point of rest of the valve body as the valve spool enters the valve bore, whereby gravity causes the valve spool to fall to the bottom of the valve body.

2. The method of claim 1 further comprising the steps of:
forming an air vortex in the nozzle; and,
directing the air vortex against the valve spool to agitate the spool as it is entering the valve body.

3. The method of claim 2 further comprising the steps of:
forming a plurality of air holes in the nozzle; and
coupling a source of air to each of the air holes, whereby the air holes and the source of air coupled to the air holes create the air vortex in the nozzle.

4. The method of claim 2 further comprising:
controlling the air flow to the air holes with an air controller; and,
sequentially providing air to the air holes formed in the nozzle in order to form the air vortex.

5. The method of claim 1 further comprising the steps of:
supporting the valve body on a slide; and,
moving the slide to vary the position of the valve body relative to the nozzle as the spool is being inserted into the body.

6. The method of claim 5 further comprising the steps of:
forming an air vortex in the nozzle;
directing the air vortex against the valve spool to agitate the spool as it is entering the valve body; and,
varying the position of the valve body relative to the nozzle as the spool is being inserted into the body to expose various areas of the spool to the air vortex formed in the nozzle.

7. The method of claim 6 further comprising the steps of:
lowering the valve body relative to the nozzle as the spool is being inserted into the valve body.

8. The method of claim 1 further comprising the steps of:
forming an air vortex in the nozzle;
directing the air vortex being against the valve spool to agitate the spool as it is entering the valve body; and,
coupling an attachment to the valve spool, the attachment enhancing the agitation effect of the air vortex on the valve spool.

9. The method of claim 8 further comprising the steps of:
coupling an extension device to one end of the valve spool, the extension device comprising the attachment; and,
extending the length of the valve spool with the extension device so that the air vortex can act on the valve spool after the valve spool has passed through the nozzle.

10. The method of claim 9 further comprising the steps of:
extending the length of the valve spool with a spring that is mounted on the end of the valve spool.

11. The method of claim 9 further comprising the steps of:
extending the length of the valve spool with a length of tubing that fits over the top end of the spool.

* * * * *